US006664752B2

United States Patent
Kanayama et al.

(10) Patent No.: US 6,664,752 B2
(45) Date of Patent: Dec. 16, 2003

(54) METHOD AND APPARATUS FOR CORRECTING ACTUATOR POSITIONING ERROR

(75) Inventors: Naoki Kanayama, Nagano-ken (JP); Kozo Sasaki, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/076,341

(22) Filed: Feb. 19, 2002

(65) Prior Publication Data

US 2002/0138177 A1 Sep. 26, 2002

(30) Foreign Application Priority Data

Feb. 19, 2001 (JP) ........................................ 2001-041788

(51) Int. Cl.[7] .............................. G05B 1/06; G05B 11/01
(52) U.S. Cl. ......................... 318/639; 718/560; 718/638
(58) Field of Search ................................. 318/652–657, 318/638, 902, 9–15, 560; 700/37, 28, 32

(56) References Cited

U.S. PATENT DOCUMENTS

| 5,021,941 A | * | 6/1991 | Ford et al. ...................... 700/71 |
| 5,305,227 A | * | 4/1994 | Sasaki et al. ................. 700/193 |
| 5,543,696 A | * | 8/1996 | Huggett et al. ............... 318/590 |
| 5,691,614 A | * | 11/1997 | Takeishi ...................... 318/561 |
| 5,691,616 A | * | 11/1997 | Iwashita ...................... 318/615 |
| 5,825,150 A | * | 10/1998 | Kachi et al. ................. 318/610 |
| 5,984,048 A | * | 11/1999 | Kiyosawa et al. ......... 184/6.12 |
| 5,986,424 A | * | 11/1999 | Nakatsuka et al. ..... 318/568.22 |
| 6,107,771 A | * | 8/2000 | Maeda ........................ 318/630 |
| 6,459,940 B1 | * | 10/2002 | Ghorbel et al. ............... 700/56 |
| 2001/0005800 A1 | * | 6/2001 | Shiba et al. ................. 700/193 |
| 2001/0045807 A1 | * | 11/2001 | McConnell et al. ..... 318/568.2 |
| 2001/0054876 A1 | * | 12/2001 | Fujita et al. ................ 318/600 |
| 2002/0024899 A1 | * | 2/2002 | Cho et al. ................. 369/44.32 |

FOREIGN PATENT DOCUMENTS

| JP | 10262387 A | * | 9/1998 | ............. H02P/5/00 |
| JP | 11064039 A | * | 3/1999 | ........... G01D/5/245 |

* cited by examiner

Primary Examiner—Robert E. Nappi
Assistant Examiner—Patrick Miller
(74) Attorney, Agent, or Firm—Burns, Doane, Swecker & Mathis, L.L.P.

(57) ABSTRACT

A method of correcting positional error in an actuator that is equipped with a motor and a wave gear reduction drive that transmits a motor output to the target load. Positioning error relative to the absolute position of the actuator output shaft is measured, to compile error correction data relating to each position on the rotation of the motor shaft. The rotational position of the motor shaft is detected and rotational position correction information produced by adding error correction values assigned to the position concerned. The rotational positional error information thus produced is used as position feedback information for controlling the positioning of the output shaft.

6 Claims, 1 Drawing Sheet

System Configuration

System Configuration under wave gear reduction drive suffer from angular transmission error...

METHOD AND APPARATUS FOR CORRECTING ACTUATOR POSITIONING ERROR

This application claims priority under 35 U.S.C. §§119 and/or 365 to JP 2001-041788 filed in Japan on Feb. 19, 2001; the entire content of which is hereby incorporated by reference.

BACKGROUND OF THE INVENTION

1. Field of the Invention

The present invention relates to a method for correcting the positioning error of an actuator having a wave gear reduction drive, and to an actuator drive control apparatus that uses the method in the actuator positioning operation.

2. Description of the Prior Art

There are actuators that are configured to move an object to a target position in which the speed of the rotational output of a motor is reduced by means of a wave gear reduction drive. The wave gear reduction drive comprises a rigid, circular spline gear with internal teeth, a flexible, circular, externally toothed spline gear (flexspline), and a wave generator. In a typical configuration, the wave generator flexes the flexspline into an elliptical shape, causing the toothed portions of the flexspline at each end of the elliptical major-axis to mesh with the corresponding internal teeth of the rigid circular spline. When the wave generator is rotated by a motor, the positions at which the two splines mesh move around the circumference, generating a relative rotation that corresponds to the difference in the number of teeth in the circular spline and in the flexspline (2n teeth, where n=1, 2, 3 . . . ). Normally, the difference in the number of teeth in the circular spline and in the flexspline is two. With the rigid circular spline fixed, the flexspline functions as a rotating speed-reduction output element whereby, on the load side to which the flexspline is coupled, the low-speed rotation is used to drive an object. The speed reduction ratio i is found by $i=1/R=(Z_c-Z_f)/Z_f$, where R is the speed ratio, $Z_f$ is the number of teeth in the flexspline, and $Z_c$ is the number of teeth in the rigid circular spline. If $Z_f=100$ and $Z_c=102$, for example, then the speed reduction ratio i would be 1/50, with the output rotation being in the reverse direction to the direction of motor rotation.

Drive control systems of actuators thus configured normally apply feedback control to control actuator positioning. However, wave gear reduction drives suffer from angular transmission error, giving rise to error between the actual point at which the actuator output shaft (the output shaft of the wave gear reduction drive) is positioned and the target position. If this error could be compensated for, it would increase the positioning accuracy of actuators equipped with wave gear reduction drives.

In the case of a two-tooth difference between the two splines, if R is the speed ratio of the wave gear reduction drive, the positioning error component per output shaft revolution can be divided into (1) Period R error component
(2) Period (R+1) error component
(3) Other error components.

Period R error components are an attribute of the rigid circular spline and (R+1) error components are an attribute of the flexspline.

SUMMARY OF THE INVENTION

An object of the present invention is to provide a method of correcting positioning error in a drive control apparatus of an actuator equipped with a wave gear reduction drive by adding, to the positioning feedback control loop thereof, a position correction function for correcting the above period (R+1) positioning error arising in the angular transmission error of the wave gear reduction drive to thereby improve the accuracy of the drive control apparatus.

In accordance with the present invention, the above object is attained by a method of correcting positional error in an actuator having a motor and a wave gear reduction drive that transmits a rotational output of the motor to a load at a reduced speed, said method comprising:

measuring positioning error relative to an absolute position of an actuator output shaft to produce error correction data relating to a rotational position of the motor shaft;

detecting a rotational position of the motor shaft;

producing rotational position correction information by adding an error correction value in the error correction data to the detected rotational position, the error correction value being assigned to the detected rotational position in the error correction data; and using the produced rotational position correction information as position feedback information for controlling the positioning of the output shaft;

wherein the error correction data is produced by measuring the positioning error for at least 1(R+1) revolution of the output shaft, where R is a speed ratio of the wave gear reduction drive.

The above object is also attained by an actuator drive control apparatus in which the above method is used to correct positioning error, said apparatus comprising:

an error correction data memory section in which error correction data is stored:

an output shaft starting-point sensor for detecting an absolute position of an output shaft:

a position detector for detecting a rotational position of a motor shaft:

a rotational position correction information generator for producing rotational position correction information based on rotational position information supplied by the output shaft starting-point sensor and the position detector, and on the error correction data: and, a feedback control section that effects feedback control by using the rotational position correction information as positional feedback information to position the actuator at a target position indicated by positional command information.

The error correction data can be maintained in memory in the position detector, in which case the data can be downloaded from the position detector to the error correction data memory section after the system power has been switched on. The error correction data can be in the form of a correction pulse data sequence or an approximation coefficient sequence representing the error correction information.

BRIEF DESCRIPTION OF THE DRAWING

The above and other objects and advantages of the invention will be more apparent from the following description and drawing, in which.

DESCRIPTION OF THE PREFERRED EMBODIMENT

Figure 1:
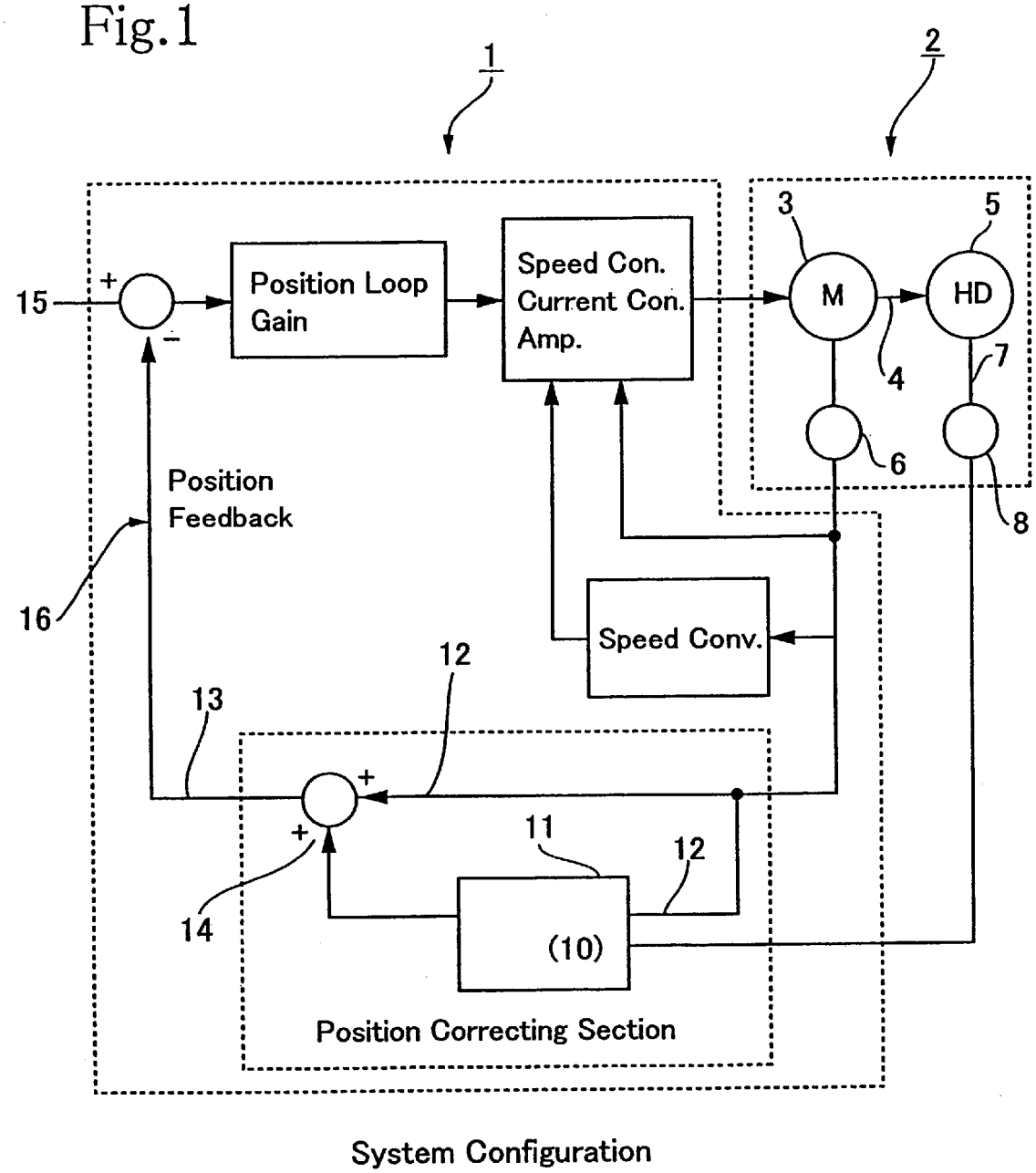
FIG. 1 is a schematic diagram of an example of an actuator drive control apparatus that applies the present invention.

An embodiment of an actuator drive control apparatus in which the present invention is applied will now be described with reference to the drawing.

FIG. 1 shows the general configuration of the actuator drive control apparatus. Actuator 2 driven by drive control apparatus 1 includes a motor 3, a wave gear reduction drive (HD) 5 coupled to the motor shaft 4, a position detector 6 able to detect the absolute rotational position of the motor shaft 4, and a starting-point sensor 8 for detecting the absolute position of the actuator output shaft 7 (the output shaft of the wave gear reduction drive 5). The position detector 6 is one that can detect the absolute position of a rotary encoder or potentiometer or the like.

The wave gear reduction drive 5 has a rigid spline gear with internal teeth, a flexible externally toothed spline gear (flexspline), and a wave generator. The wave generator is used as a motor rotation input element, the internally toothed spline is fixed, and the externally toothed flexspline forms a reduced-rotation-speed output element (output shaft 7). The wave generator is elliptical in shape, and the difference in the number of teeth in the two splines is two. The flexspline is flexed into an elliptical shape, causing the toothed portions of the flexspline at each end of the elliptical major-axis to mesh with the corresponding internal teeth of the rigid circular spline, with the positions at which the splines mesh being moved around the circumference by the rotation of the wave generator. The speed reduction ratio i of the wave gear reduction drive 5 is $i=1/R=(Zc-Zf)/Zf$, so if the number of flexspline teeth Zf is 100 and the number of rigid spline teeth Zc is 102, the reduction ratio i will be 1/50, with the output rotation being in the reverse direction from the direction of motor rotation.

The drive control apparatus 1 that controls the actuator 2 includes an error correction data memory section 11 in which is stored error correction data 10 for compensating for positioning error arising from the angular transmission error of the wave gear reduction drive 5, a rotational position correction information generator 14 that generates rotational position correction information 13 based on rotational position information 12 received from the position detector 6 and on the error correction data 10, and a feedback control section 16 that uses the rotational position correction information 13 thus generated as positional feedback control information to position the actuator 2 at the target position indicated by position command information 15. The rotational position correction information generator 14 can be an adder or subtractor.

The error correction data 10 is generated as follows. First, positioning error of the motor shaft 4 is compressed to a fraction of the reduction ratio effected by the wave gear reduction drive 5 to which the motor shaft 4 is coupled. In this example, the wave gear reduction drive 5 has a reduction ratio of 50, so the positioning error of the motor is compressed to 1/50. Therefore, since the positioning error of the actuator 2 comes mainly from the angular transmission error of the wave gear reduction drive 5, the unidirectional positioning accuracy of the actuator 2 is determined by the angular transmission error of the wave gear reduction drive 5.

With rotation being in one direction, the difference between the actual angle of rotation from a reference point and what the angle of rotation should be is obtained at each point for one full revolution. The unidirectional positioning accuracy is the maximum error value per revolution. In this example, the unidirectional positioning accuracy of the actuator 2 is measured for one full revolution of the actuator output shaft 7, using the absolute position of the output shaft 7 as the reference. With the wave gear reduction drive 5 having a reduction ratio i of 1/50, the actuator output shaft 7 completes one revolution for every 50 revolutions of the motor shaft 4. With respect to this measurement, the output of the starting-point sensor 8 is used at initialization for absolute position detection.

In practice, the angular precision of the wave gear reduction drive can be used in place of the unidirectional positioning accuracy. Also, although it is only necessary to measure for 1/(R+1) rotation of the actuator output shaft 7, measurement can of course be conducted over one or more revolutions.

The measured data are then averaged to produce error correction data 10 that applies to the rotational positions of the motor shaft 4. Data applying to up to one revolution of the motor shaft 4 is sufficient. The error correction data 10 can be in the form of correction pulses for correcting each angular position of the motor shaft 4. Alternatively, error correction data relating to each angular position of the motor shaft 4 can be developed as Fourier series to obtain an approximation curve, with the coefficients of the Fourier series being stored in memory as the error correction data 10. In this case, in the initialization process following the switching on of the drive power of the drive control apparatus 1, the coefficients maintained in memory can be applied to an approximation formula to calculate correction data to generate correction pulse data.

Here, it is only necessary to generate an extent of error correction data 10 corresponding to 1/(R+1) revolution of the output shaft 7. Thus, since in this example R=50, in terms of the input shaft (motor shaft), it is necessary to generate data for a motor shaft rotation of 360 degrees×50/51=352.9 degrees. The error correction data 10 can be set, for example, for every 3 degrees of motor shaft rotation, or each of 120 segments into which the 352.9 degrees is divided. Since 352.9 degrees is an indivisible angle, the actuator output shaft 7 can be provided with a reference point that is used to produce the correction data. Correction for one rotation of the actuator output shaft 7 will be effected by correcting the 359.2 degrees of the motor shaft (R+1) times.

The correction of positioning error that characterizes the actuator drive control operation of the drive control apparatus 1 will now be described. Based on the absolute position of the motor shaft 4 as shown by position detection feedback pulses (12) from the position detector 6, the number of correction pulses is obtained from the error correction data 10 and added to the feedback pulses (12) by the rotational position correction information generator 14, and the result is returned to the feedback control section 16 as positional feedback pulses (13). Based on the positional feedback pulses (13), the feedback control section 16 applies feedback control to move the actuator 2 to the target position indicated by the input position command information 15.

In this example the error correction data 10 is maintained in memory in the drive control apparatus 1. However, the error correction data 10 can instead be maintained in memory in the actuator position detector 6, in which case the system can be configured so that the data 10 is downloaded from the position detector 6 to the drive control apparatus 1 during system power-up initialization.

In the above example, control is effected that eliminates error included in (R+1) actuator periods. Extremely high positioning accuracy can of course be obtained by also eliminating the period R error component. This can be done as follows. First, positioning error of the output shaft can be corrected based on absolute positions on one revolution of the motor shaft. Specifically, error correction data can be produced by measuring the positioning error of the actuator 2 relative to absolute positions on one revolution of the motor shaft 4. In operation, the rotational position of the motor shaft 4 can be detected and the error correction value assigned to the detected position added to the detected rotational position information to produce rotational position correction information that can be used as positional feedback information for controlling the positioning of the output shaft.

Error correction data can be produced by measuring the positional error of the actuator 2 for at least one revolution of the output shaft, using the motor shaft 4 as an absolute positional reference. The measured correction data can be averaged to produce error correction data representing error correction values at each rotational point of one revolution of the motor shaft.

Two correction tables can be prepared in the positional correction data memory section to correct both (R+1) and R error components. Using the position of the motor shaft 4 as an absolute reference point, correction values from the two tables can be used for simultaneous correction. The (R+1) error correction data can be produced based on data following the removal of the R error correction components (measured data or simulation-based data). (R+1) error components also can be calculated from measured results, so the error component of the actuator output shaft 7 can be measured and used to produce the (R+1) error correction table.

The method of producing R error correction data and the correction of the R error components using the error correction data will now be described.

First, the unidirectional positioning accuracy of the actuator 2 is measured for one full revolution of the actuator output shaft 7, using the absolute position of the motor shaft 4 as the reference. With a wave gear reduction drive 5 having a speed ratio of 1/50, the actuator output shaft 7 completes one revolution for every 50 revolutions of the motor shaft 4. Positioning error at every 3 degrees of motor shaft rotation is measured, based on the output of the position detector 6. The number of measurement points will therefore be 120 (360 degrees divided by 3 degrees), which, in terms of the actuator output shaft 7, will be 120 points×(speed ratio). In practice, the angular precision of the wave gear reduction drive can be used in place of the unidirectional positioning accuracy. Also, measurement can of course be conducted over more than one revolution.

The error data at the 120 points are averaged to produce the error correction data for one revolution of the motor shaft 4. The error correction data thus compiled can be in the form of a number of correction pulses used for error correction at each point of rotation through one revolution of the motor shaft 4. The correction pulses can, for example, be used to form a table corresponding to every three degrees of rotation of the motor shaft 4. Instead, the error correction data relating to each angular position of the motor shaft 4 can be developed as Fourier series to obtain an approximation curve, with the coefficients of the Fourier series being stored in memory as the error correction data 10. In this case, in the initialization process following the switching on of the drive power of the drive control apparatus 1, the coefficients maintained in memory can be applied to an approximation formula to calculate correction data to generate the correction pulse data.

As described in the foregoing, in the actuator positioning error correction method of this invention, first, angular transmission error of the wave gear reduction drive is measured to produce error correction data for correcting positional error at each point on the rotation of the motor shaft. Based on the absolute position of the motor shaft, an error correction value is obtained from the error correction data and used to correct positional feedback information. As a result, in accordance with the present invention, the positioning accuracy of an actuator having a wave gear reduction drive is improved.

What is claimed is:

1. A method of correcting positional error in an actuator having a motor and a wave gear reduction drive that transmits a rotational output of the motor to a load at a reduced speed, said method comprising:

measuring positioning error relative to an absolute position of an actuator output shaft to produce error correction data relating to a rotational position of the motor shaft;

detecting a rotational position of the motor shaft;

producing rotational position correction information by adding an error correction value in the error correction data to the detected rotational position, the error correction value being assigned to the detected rotational position in the error correction data; and using the produced rotational position correction information as position feedback information for controlling the positioning of the output shaft;

wherein the error correction data is produced by measuring the positioning error for at least 1/(R+1) revolution of the output shaft, where R is a speed ratio of the wave gear reduction drive.

2. The method according to claim 1, wherein positioning error for at least one rotation of the output shaft is measured and the measured error data is averaged to produce error correction data that represents error correction values for each rotational position of the motor output shaft.

3. An actuator drive control apparatus in which the method of claim 1 is used to correct positioning error, said apparatus comprising:

an error correction data memory section in which error correction data is stored;

an output shaft starting-point sensor for detecting an absolute position of an output shaft;

a position detector for detecting a rotational position of a motor shaft;

a rotational position correction information generator for producing rotational position correction information based on rotational position information supplied by the output shaft starting-point sensor and the position detector, and on the error correction data; and a feedback control section that effects feedback control by using the rotational position correction information as positional feedback information to position the actuator at a target position indicated by positional command information.

4. The apparatus according to claim 3, wherein the error correction data is maintained in memory in the position detector, said data being downloaded from the position detector to the error correction data memory section when system power is switched on.

5. The apparatus according to claim 3, wherein the error correction information for each point of motor shaft rotation for 1/(R+1) rotation of the output shaft is in the form of a correction pulse data sequence or an approximation coefficient sequence representing the error correction information.

6. The apparatus according to claim 4, wherein the error correction information for each point of motor shaft rotation for 1/(R+1) rotation of the output shaft is in the form of a correction pulse data sequence or an approximation coefficient sequence representing the error correction information.

* * * * *